R. E. JEAN.
WORK CARRIER.
APPLICATION FILED APR. 18, 1914.
1,129,296.
Patented Feb. 23, 1915.
2 SHEETS—SHEET 2.
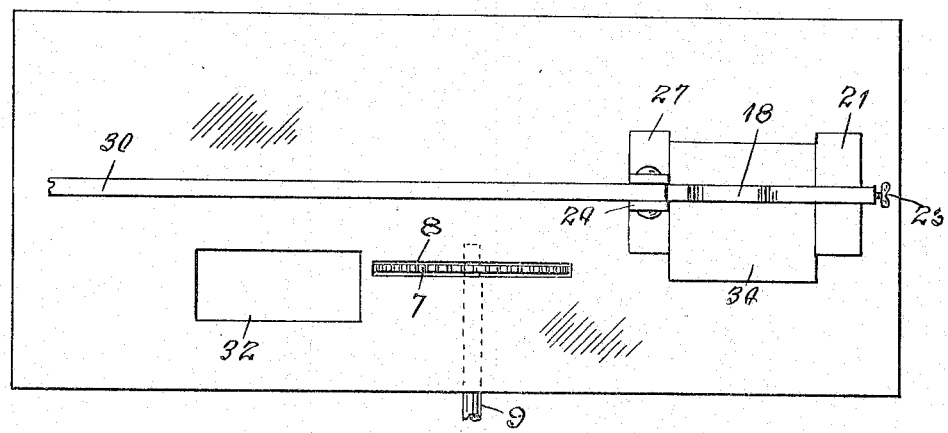
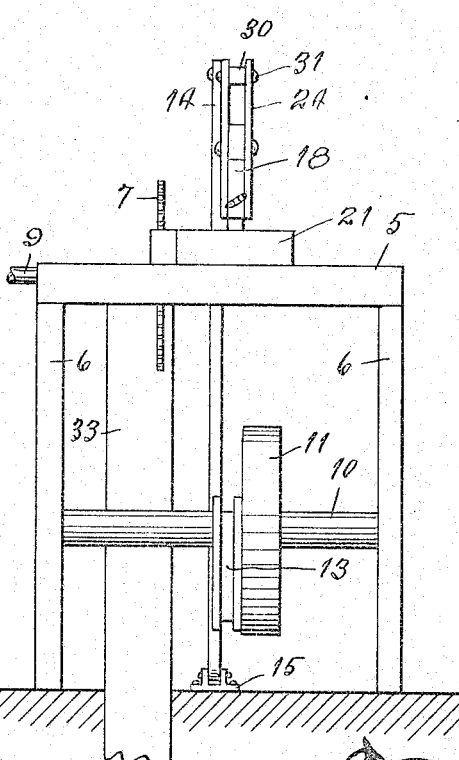

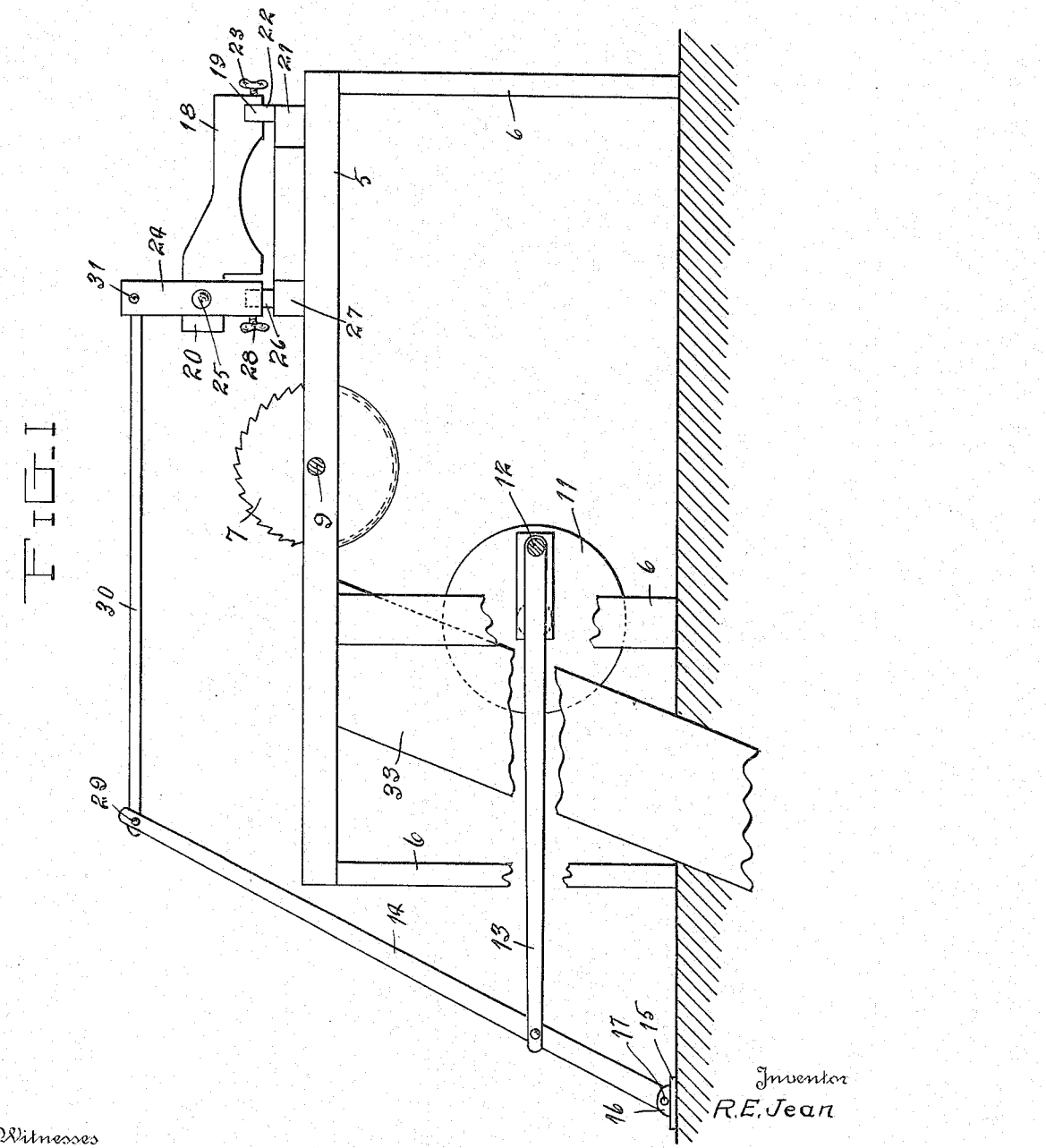

UNITED STATES PATENT OFFICE.

ROBERT E. JEAN, OF UNIONVILLE, TENNESSEE, ASSIGNOR OF ONE-HALF TO WILLIAM R. MIDDLETON, OF UNIONVILLE, TENNESSEE.

WORK-CARRIER.

1,129,296.  Specification of Letters Patent.  Patented Feb. 23, 1915.

Application filed April 18, 1914. Serial No. 832,901.

*To all whom it may concern:*

Be it known that I, ROBERT E. JEAN, a citizen of the United States, residing at Unionville, in the county of Bedford and State of Tennessee, have invented certain new and useful Improvements in Work-Carriers; and I do hereby declare the following to be a full, clear, and exact description of the invention, such as will enable others skilled in the art to which it appertains to make and use the same.

This invention relates to work carriers for saw mills, and more particularly to devices for automatically clamping and feeding work to a circular saw for cutting the work into slats.

An object of the invention is to provide a work clamp or holder automatically operated to grip and release the work by the operation of the machinism.

Another object is to provide power operated means for reciprocating the clamp or holder to automatically feed the work to the saw.

With these and other objects in view, the invention consists in the novel construction, arrangement and formation of parts as will be hereinafter specifically described, claimed and illustrated in the accompanying drawings, in which, Figure 1 represents a side elevation of the work carrier applied to use, Fig. 2 represents a top plan view thereof, and, Fig. 3 represents a rear elevation of the mechanism.

Referring to the drawing in detail, wherein similar reference numerals designate corresponding parts throughout the several views, the numeral 5 indicates the table of a sawing machine supported by a suitable frame including legs 6. A saw 7 projects upwardly through an opening 8 formed in the table 5 and is rotatably supported or rigidly secured to a shaft 9 rotatably journaled in said table. A shaft 10 is rotatably mounted between two of the legs 6 and is disposed parallel with the shaft 9. A flywheel or pulley 11 is secured to the shaft 10 and the latter is formed adjacent said flywheel or pulley with a crank 12 connected with a pitman 13 connected at its outer end with an upstanding lever 14. The connection between the pitman 13 and the lever 14 is made adjacent the lower end of the latter. A block 15 having a pair of upstanding ears 16 receives the lower end of the lever 14 and a pivot pin 17 is positioned through said ears and the lever. A work holder or clamp is mounted above the table 5 and comprises a body 18 having the front end recessed as at 19 and a rear extension 20. A rigid clamping jaw 21 having an upstanding tongue 22 is secured in the recess 19 by a screw 23. A pair of levers 24 are pivotally connected with the extension 20 by a pin 25 and receive at their lower ends the tongue extension 26 of a pivoted jaw 27. The tongue extension 26 is secured between the pivoted levers 24 by a set screw or the like 28. The jaws 21 and 27 are preferably formed of wood or a similar fibrous and inexpensive material which may be quickly and cheaply replaced.

The upper end of the lever 14 is pivotally connected at 29 with a connecting rod 30 the opposite end of which is connected at 31 between the upper ends of the pivoted levers 24. The work clamp or holder is adapted to be reciprocated across the top of the table 5 by the connecting rod 30, lever 14, pitman 13, crank 12 and shaft 10, when the latter is connected with a suitable source of power. An opening 32 is formed through the table 5 at a point near the rear end thereof represented by the rearmost point of travel of the work clamp and holder. The opening 32 communicates with a chute 33 extending downwardly from the table 5 and adapted to conduct pieces of material cut from the block of work to a point removed from the machine.

In operation, a block of wood or other material 34 to be cut into strips is positioned between the jaws 21 and 27 as clearly illustrated in Fig. 1. The work clamp or holder is adjusted manually to a position in the path of the saw 7. The operating mechanism of the work clamp and holder is set in operation and the latter caused to reciprocate longitudinally of the table 5 cutting a strip from the block 34. As the work holder and clamp reaches its forward limit of travel, the strip cut from the block 34 projects over the edge of the opening 32 and falls through the latter into the chute 33. As the work holder moves rearwardly during its reciprocation over the table 5 the pivoted block 27 is moved a limited distance away from the rigid block 21 thereby releasing the block 34 and permitting the operator to adjust the latter to cut another strip therefrom.

What I claim is:—

In combination, a table, a shaft rotatably mounted under said table, a crank on said shaft, a lever pivoted at its lower end, a pitman connecting said lever with said crank, a body, a jaw removably secured to said body and engaging the top of said table, a pair of levers pivoted to said body, a jaw removably secured between said levers and engaging the top of said table, and a link connection between the upper extremities of said lever and said pair of levers.

In testimony whereof I affix my signature in presence of two witnesses.

ROBERT E. JEAN.

Witnesses:
ROBERT M. LEWIS,
ALVA M. POTTS.

Copies of this patent may be obtained for five cents each, by addressing the "Commissioner of Patents, Washington, D. C."